2,905,664
SULFURIZATION PROCESS

George R. L. Shepherd, Ira G. Thompson, and Albert T. Watson, Baytown, Tex., assignors, by mesne assignments, to Esso Research and Engineering Company, Elizabeth, N.J., a corporation of Delaware No Drawing. Application September 11, 1957
Serial No. 683,232

5 Claims. (Cl. 260—125)

This invention relates to a process for sulfurizing halogenated hydrocarbons. More particularly, this invention relates to a process for adding controlled amounts of sulfur to halogenated hydrocarbons.

It is frequently desirable to improve the physical properties of halogenated hydrocarbons, such as halogenated hydrocarbons to be used as cutting oils, by replacing at least a portion of the halogen atoms with sulfur.

It has been discovered that sulfurized halogenated petroleum oils which are particularly useful as cutting oils may be prepared by thermally treating a halogenated hydrocarbon with an aqueous solution of a mixture of an alkali metal or alkaline earth metal sulfite with an alkali metal or alkaline earth metal bisulfite, the amount of bisulfite present in the reaction mixture being sufficient to provide an aqueous phase having a pH within the range of about 5 to 9.

The feed stock for the present invention may be a hydrocarbon to which a suitable halogen such as chlorine or bromine has been added in any suitable manner such as, for example, by photochemical halogenation, thermal halogenation, etc. A preferred class of feed stocks are aliphatic hydrocarbons having an initial molecular weight within the range of about 100 to 500 which have been halogenated to an extent sufficient to provide for the addition of from about 1 to 5 chlorine atoms per molecule of hydrocarbon, such aliphatic hydrocarbons being particularly desirable base materials for the preparation of cutting oils. Still more preferably, an aliphatic hydrocarbon feed stock is provided having an initial molecular weight within the range of about 400 to 450.

The halogenated hydrocarbon is treated with an aqueous medium containing a mixture of an alkali metal or alkaline earth metal sulfite with an alkali metal or alkaline earth metal bisulfite, the bisulfite being present in an amount sufficient to provide an aqueous medium having a pH within the range of about 5 to 9. In general, it is preferable to employ a pH within the range of 5 to 6.5 in that the reaction may be conducted at lower temperatures and in that a product containing a maximized amount of sulfur is formed. Examples of suitable mixtures of sulfites and bisulfites which may be employed are mixtures of sodium sulfite with sodium bisulfite, mixtures of potassium sulfite with potassium bisulfite, mixtures of calcium sulfite with calcium bisulfite, etc.

The aqueous treating medium of the present invention may be conveniently prepared by passing sulfur dioxide through an aqueous medium containing a dissolved alkali metal or alkaline earth metal hydroxide, whereby the corresponding sulfites and bisulfites will be formed. Sulfur dioxide should be charged until an aqueous medium having the desired pH is obtained.

The thermal treatment for sulfurization in accordance with the present invention is a treatment which requires an induction period in order to initiate the desired sulfurization reaction. The sulfurization reaction is preferably conducted at a temperature within the range of about 380° to 450° F. and, still more preferably, at a temperature of about 400° to 450° F. At temperatures of more than about 500° F., only comparatively small amounts of sulfur are fixed by the process of the present invention. The length of the induction period is dependent upon temperature and is also influenced by the pH of the aqueous medium. Thus, at temperatures within the range of about 380° to 450° F., a comparatively short induction period of about 30 to 90 minutes is normally required whereas at temperatures intermediate about 300° to 380° F. a substantially longer induction period of at least about 2 hours is required. When the induction is complete, a rapid exothermic reaction commences which gives rise to a sharp and pronounced heat kick. The exothermic reaction will normally continue for a period of about 10 to 30 minutes and at the end of this time the sulfurization reaction is substantially complete.

The sulfurization reaction is preferably conducted in a closed vessel and therefore the pressure employed in conducting the reaction will be dependent on the temperature which is employed for the reaction period. In general, the pressure will be within the range of about 50 to 500 p.s.i.g.

The sulfurized product may be recovered at the end of the reaction in any suitable manner, such as by a decantation step, a distillation step, etc. or a suitable combination of such steps.

The invention will be further illustrated by the following specific examples which are given by way of illustration and not as limitations on the scope of this invention.

EXAMPLE I

A chlorinated feed stock was prepared by photochemically chlorinating an aliphatic hydrocarbon charge stock having a molecular weight of about 440, the chlorinated feed stock containing about 17.6 weight percent of chlorine. Portions of the thus-prepared feed stock were treated with an aqueous medium containing sodium sulfite and sodium bisulfite in a series of 4 hour runs conducted at progressively increasing temperatures and pressures. At the end of each run, the reaction mixture was allowed to settle and the sulfurized, chlorinated hydrocarbon product was recovered by decantation. Each of the reaction products was analyzed for sulfur content and chlorine content. The reaction conditions employed and the results obtained are set forth in the following table.

Table 1

| Run No. | Reactor charge (parts) | | | | pH | Temp., °F. | Pressure, p.s.i.g. | Time, hours | Product composition, weight percent | |
|---|---|---|---|---|---|---|---|---|---|---|
| | Feed | Water | Sodium sulfite | Sodium bisulfite | | | | | S | Cl |
| 1 | 100 | 197 | 68.8 | 54.9 | 5.99 | 325 | 70 | 4 | 0.26 | 14.46 |
| 2 | 100 | 197 | 68.8 | 54.9 | 5.99 | 350 | 90 | 4 | 0.91 | 12.58 |
| 3 | 100 | 197 | 68.8 | 54.9 | 5.99 | 350 | 105 | 4 | 0.42 | 13.46 |
| 4 | 100 | 197 | 68.8 | 54.9 | 5.99 | 375 | 165 | 4 | 6.73 | 7.42 |
| 5 | 100 | 197 | 69.3 | 54.9 | 5.98 | 385 | | 4 | 9.63 | 7.72 |
| 6 | 100 | 197 | 69.3 | 54.9 | 5.98 | 410 | | 4 | 9.62 | |

With reference to runs 1 to 3, conducted at temperatures of 325° and 350° F., it is to be noted that only a minor amount of sulfur was fixed. This is attributable to the fact that the induction period was not completed in these three runs so that, as a consequence, very little reaction took place. At a temperature of 375° F., 4 hours provided a sufficient induction period and it will be observed that substantial sulfurization of the feed stock occurred. Runs 5 and 6 were conducted at still higher temperatures of 385° and 410° F., respectively, and there was a still further increase in the amount of sulfur that was fixed. Runs 5 and 6 demonstrate that it is preferred to conduct the sulfurization reaction of the present invention at temperatures in excess of about 375° F., such as, for example, temperatures within the range of about 380° to 450° F.

EXAMPLE II

In further illustration of the present invention, an aliphatic hydrocarbon feed stock having an initial molecular weight of about 440 was thermally treated with molecular chlorine to provide a chlorinated hydrocarbon product containing about 14.6 weight percent of chlorine. A first portion of the chlorinated product was treated with an aqueous medium containing a mixture of sodium sulfite with sodium bisulfite, the bisulfite-sulfite ratio being sufficient to provide a pH of 6.31. The treating solution contained about 2 parts of water, about 3.9 parts of sodium sulfite and about 3.0 parts of sodium bisulfite per part of water. The sulfurization reaction was conducted at a temperature of 375° F. and a pressure of about 166 p.s.i.g. for a period of about 4 hours. At the end of this time the reaction mixture was allowed to settle and the aqueous phase was separated from the oil phase. The resultant product contained about 3.9 weight percent of sulfur and about 9.41 weight percent of chlorine.

When the feed stock is a brominated derivative of the 440 molecular weight aliphatic feed stock and the example is otherwise repeated, the product is a sulfurized, brominated hydrocarbon.

When the example was repeated, employing a pH of about 6.20, the final product contained about 5.81 weight percent of sulfur and about 7.74 weight percent of chlorine.

Equivalent results are obtained when the sodium sulfite-sodium bisulfite mixture is replaced with a potassium sulfite-potassium bisulfite mixture and the example is otherwise repeated.

In like manner, a mixture of calcium sulfite-calcium bisulfite may also be employed.

EXAMPLE III

A series of runs were conducted to determine the length of induction period that is required for satisfactory sulfurization. In conducting each of the runs, the aqueous medium consisted of 400 cc. of water containing 141 grams of sodium sulfite and 112 grams of sodium metabisulfite. In a first run a 440 molecular weight aliphatic hydrocarbon which had been photochemically chlorinated to provide a chlorinated hydrocarbon containing 17.6 weight percent of chlorine was heated to a temperature of about 385° F. over a 1 hour period while continuously recording temperature. The reaction mixture was then maintained at this temperature while continuously recording temperature for an additional 190 minutes. At that time a very sudden evolution of heat occurred, indicating that a highly exothermic reaction was occurring. The heat kick lasted for about 15 minutes, at the end of which time the temperature returned to about 385° F. The product from this run contained about 8.63 weight percent of sulfur and about 7.73 weight percent of chlorine. It is seen, therefore, that in this particular instance an induction period of about 2 hours was required.

A second run was next conducted but in this instance a temperature of 410° F. was maintained. In the second run the heat kick occurred after an induction period of about 50 minutes, the temperature suddenly rising at this time from about 410° to about 420° F. and then subsiding after about 20 minutes. The product from this run contained 8.63 weight percent sulfur.

In a third run, 3(chloromethyl) heptane was the charge stock. In this instance the temperature was maintained at about 415° F. Again, an induction period of about 50 minutes was required, a heat kick occurring at the end of this time. The product of this run contained about 15.9 weight percent of sulfur and about 1.73 weight percent of chlorine.

Attempts to characterize the molecular structure of the sulfurized chlorinated hydrocarbon product of runs made with 3(chloromethyl) heptane (see Example III) and a thermally chlorinated oil (second case in Example II) were unsuccessful. Thus, infrared and chemical analysis indicated that the product was substantially oxygen-free, showing that the product was not a sulfonic or sulfinic acid. Polarographic analysis shows very little free sulfur. It appears, therefore, that the sulfur may be present in the sulfurized product as sulfide and polysulfide groupings.

Having described our invention, what is claimed is:

1. A process for preparing a sulfurized halogenated hydrocarbon which comprises thermally treating a halogenated acyclic aliphatic saturated hydrocarbon having a molecular weight within the range of about 100 to 500 with an aqueous medium containing a mixture of a sulfite with a bisulfite under conditions including a temperature within the range of about 300° to about 500° F. to replace exothermally at least a portion of the halogen of the feed stock with sulfur, the amount of bisulfite present in said aqueous medium being sufficient to provide an aqueous medium having a pH within the range of 5 to 9, said sulfite being selected from the group consisting of alkali metal and alkaline earth metal sulfites, said bisulfite being selected from the class consisting of alkali metal and alkaline earth metal sulfites, said halogen being selected from the group consisting of chlorine and bromine.

2. A method as in claim 1 wherein the feed stock is a chlorinated hydrocarbon and wherein the aqueous medium has a pH within the range of about 5.5 to 6.5.

3. A method for preparing a sulfurized chlorinated hydrocarbon which comprises intimately contacting a chlorinated acyclic saturated aliphatic hydrocarbon feed stock having a molecular weight within the range of about 100 to 500 with an aqueous medium containing a mixture of sodium sulfite with sodium bisulfite at a temperature within the range of about 380° to 450° F. for a period of time within the range of about 30 to 90 minutes sufficient to replace exothermally at least a portion of the chlorine in the feed stock with sulfur, the amount of sodium bisulfite in said aqueous medium being sufficient to provide an aqueous medium having a pH within the range of about 5.5 to 6.5.

4. A method as in claim 3 wherein the chlorinated hydrocarbon is a chlorinated hydrocarbon having a molecular weight within the range of about 400 to 450.

5. A method which comprises intimately contacting 3(chloromethyl) heptane with an aqueous medium containing a mixture of sodium sulfite with sodium bisulfite at a temperature within the range of about 380° to 450° F. for a period of time within the range of about 30 to 90 minutes sufficient to replace exothermically at least a portion of the chlorine in the feed stock with sulfur, the amount of sodium bisulfite in said aqueous medium being sufficient to provide an aqueous medium having a pH within the range of about 5.5 to 6.5.

No references cited.